(12) United States Patent
Boyer et al.

(10) Patent No.: US 11,649,023 B2
(45) Date of Patent: May 16, 2023

(54) ESCAPE SYSTEM

(71) Applicant: SURVITEC GROUP LIMITED, Birkenhead (GB)

(72) Inventors: Maxime Boyer, Birkenhead (GB); Stewart Gregory, Birkenhead (GB); Michael Luck, Seesen (DE); Duncan McCaughan, Lisburn (GB)

(73) Assignee: SURVITEC GROUP LIMITED, Birkenhead (GB)

( * ) Notice: Subject to any disclaimer, the term of this patent is extended or adjusted under 35 U.S.C. 154(b) by 642 days.

(21) Appl. No.: 16/612,696

(22) PCT Filed: May 11, 2018

(86) PCT No.: PCT/EP2018/062245
§ 371 (c)(1),
(2) Date: Nov. 11, 2019

(87) PCT Pub. No.: WO2018/206785
PCT Pub. Date: Nov. 15, 2018

(65) Prior Publication Data
US 2020/0062358 A1    Feb. 27, 2020

(30) Foreign Application Priority Data

May 12, 2017  (GB) .................................. 1707684
Mar. 16, 2018  (GB) .................................. 1804260

(51) Int. Cl.
*B63C 9/22* (2006.01)
*A62B 1/20* (2006.01)
*B63C 9/04* (2006.01)

(52) U.S. Cl.
CPC .................. *B63C 9/22* (2013.01); *A62B 1/20* (2013.01); *B63C 9/04* (2013.01); *B63C 2009/042* (2013.01)

(58) Field of Classification Search
CPC ....... B63C 9/22; B63C 9/04; B63C 2009/042; A62B 1/20; B63B 27/143; B63B 2027/145; B64D 25/14
See application file for complete search history.

(56) References Cited

U.S. PATENT DOCUMENTS

| | | | | |
|---|---|---|---|---|
| 5,765,500 | A | * | 6/1998 | Nordbø ..................... A62B 1/20 114/365 |
| 8,312,967 | B2 | * | 11/2012 | Nielsen ..................... A62B 1/20 182/48 |

(Continued)

FOREIGN PATENT DOCUMENTS

| | | |
|---|---|---|
| GB | 2040844 A | 9/1980 |
| GB | 2131369 A | 6/1984 |

(Continued)

OTHER PUBLICATIONS

International Search Report and Written Opinion dated Sep. 10, 2018, (20 pages).

(Continued)

*Primary Examiner* — Anthony D Wiest
(74) *Attorney, Agent, or Firm* — Maschoff Brennan

(57) ABSTRACT

An escape system comprises a passage (1), a platform (3) and at least one craft (4), the platform (3) and the craft (4) being deployable from a structure (2) to water to facilitate evacuation of the structure via the passage. The passage is mounted to the platform such that the platform is urged towards the structure when deployed. The passage may be mounted to the platform such that movement of the passage relative to the platform is restricted in at least one direction. A plate (64) may support the passage, platform and/or craft during deployment, and/or stabilises the passage, platform and/or craft after deployment in the water.

10 Claims, 12 Drawing Sheets

(56) References Cited

U.S. PATENT DOCUMENTS

| | | | |
|---|---|---|---|
| 9,272,757 B2 * | 3/2016 | Ibsen | ................ B63C 9/22 |
| 2014/0165899 A1 | 6/2014 | Ceeney et al. | |

FOREIGN PATENT DOCUMENTS

| | | | | |
|---|---|---|---|---|
| GB | 2291845 A | 2/1996 | | |
| GB | 2547641 A | 8/2017 | | |
| GB | 2555576 A | 5/2018 | | |
| WO | 9514605 A1 | 6/1995 | | |
| WO | WO-9514605 A1 * | 6/1995 | .......... | B63B 27/143 |
| WO | 9729946 A1 | 8/1997 | | |
| WO | 2005021371 A1 | 3/2005 | | |
| WO | 2017140890 A1 | 8/2017 | | |
| WO | 2018007804 A1 | 1/2018 | | |

OTHER PUBLICATIONS

United Kingdom Intellectual Property Office Search Report Under Section 17(5) dated Oct. 18, 2018, (4 pages).

* cited by examiner

ESCAPE SYSTEM

TECHNICAL FIELD

The present invention relates to an escape system comprising a passage and a platform for allowing access to at least one craft, the platform being deployable from a structure to water to facilitate evacuation of the structure via the passage.

BACKGROUND TO THE INVENTION

An escape system, such as an evacuation system is used for evacuating people from a structure at sea in the event of an emergency. Such a structure may be an oil rig or a ship.

One form of evacuation system includes an inflatable craft into which the people are evacuated. Since, when inflatable crafts are deployed on water, there is usually a significant difference in height (freeboard) between the point on the structure from which the people are evacuated and the inflatable crafts, it is necessary to provide some form of passage between the two.

It is known to provide an angled or vertical passage, which may be formed from inflatable members, extending between the evacuation point and the inflatable crafts. The angled or vertical passage can extend either direct to the inflatable crafts or to an inflatable floating structure or platform to which the inflatable crafts are attached. In some vessels, the freeboard may be 14-15 metres and so the angled or vertical passage is of significant length.

Evacuation systems should preferably be able to operate in force six weather which will include a 3 metre swell.

An angled or vertical passage is not readily able to meet such a requirement as the angled or vertical passage projects from the side of a vessel and is subjected to significant lateral movements in heavy weather which may make evacuation hazardous.

It would be desirable to provide an improved evacuation system able to operated safely in heavy weather.

SUMMARY OF THE INVENTION

A first aspect of the present invention provides an escape system comprising a passage and a platform for allowing access to at least one craft, the platform being deployable from a structure to water to facilitate evacuation of the structure via the passage, wherein the passage is mounted to the platform by connecting means such that the platform is urged towards the structure when deployed.

The connecting means may comprise an elastically deformable member that is deformed elastically in response to relative movement of the platform away from the structure. The connecting means may comprise a tension spring or an elastic cord assembly.

The connecting means may comprise a member for submersion in the water in use and which is fixed to the passage and moveably mounted to the platform. The member may be arranged to cause drag in the water to urge the platform towards the structure. The member may comprise a weight or sea anchor.

A second aspect of the present invention provides an escape system comprising a passage and a platform for allowing access to at least one craft, the platform being deployable from a structure to water to facilitate evacuation of the structure via the passage, wherein the passage is mounted to the platform such that movement of the passage relative to the platform is restricted in at least one direction.

One of the platform and the passage may include at least one engagement member or slidably engaging a corresponding structure of the other of the platform and the passage such that the movement of the passage relative to the platform is restricted in the at least one direction.

The engagement member may comprise a wall or similar vertical structure. The wall may be formed on the platform for restricting relative movement of the passage in a direction generally transverse to the longitudinal axis of the passage. Two walls may be provided, one on each side of the longitudinal edge of the passage so that movement of the passage is constrained in the transverse direction.

The engagement member may comprise a rail and the corresponding structure for slidably engaging the rail may comprise a recess member defining a recess for accommodating the rail. This may allow longitudinal relative movement but restrict transverse relative movement.

The recess may be substantially rectangular or semi-circular in cross-section and may be configured for fitting onto the rail.

The rail may include a coupling portion that is connected to the associated one of the platform and the passage by a relatively narrow connector, and wherein the recess includes a chamber having a relatively narrow mouth, the chamber being configured to accommodate the coupling portion of the rail, with the connector extending through the mouth. This may prevent the passage lifting off the platform.

The coupling portion and/or the chamber may be substantially circular in cross-section.

The platform may be coupled to the passage so as to restrict lifting of the passage from an upper surface of the platform (e.g. caused by wind acting on the passage). A cable or the like may be used to perform the coupling. The coupling may be such that movement along the longitudinal axis of the passage is possible.

A third aspect of the present invention provides an escape system comprising a passage, a platform for allowing access to at least one craft, and a plate mounted beneath the platform and craft, the escape system being deployable from a structure to water to facilitate evacuation of the structure via the passage, wherein the plate supports the passage, platform and/or craft during deployment, and/or stabilises the passage, platform and/or craft after deployment in the water.

The plate may be attached to the structure by cable means that passes through the platform.

A fourth aspect of the present invention provides an escape system comprising a passage and a platform for allowing access to at least one craft, the platform being deployable from a structure to water to facilitate evacuation of the structure via the passage, wherein the passage includes a distal end portion arranged to contact the platform and configured to direct evacuees from the passage towards at least one area of the platform for boarding one or more crafts.

Such an arrangement may safely direct evacuees to a desired area of the platform and so they arrive at an appropriate and safe speed.

The passage may comprise at least one flexible chute for supporting evacuees during their evacuation via the passage, the distal end portion being configured to direct evacuees from the chute towards the at least one area of the platform for boarding the one or more crafts.

The chute may include at least one partitioning wall defining at least two slide paths for the evacuees during evacuation, the distal end portion being configured to direct evacuees from a first of said slide paths towards one area of the platform for boarding a first one of the crafts, and from a second of said slide paths towards another area of the platform for boarding a second one of the crafts.

The distal end portion may comprise a guiding wall configured to change the direction a movement of evacuees as the reach the distal end of the passage to direct the evacuees from the passage towards at least one area of the platform for boarding one or more crafts.

A fifth aspect of the present invention provides an escape system comprising a passage and a platform for allowing access to at least one craft, the platform being deployable from a vessel to water to facilitate evacuation of the structure via the passage, wherein the passage is configured to extend aft from an evacuation point on the vessel.

The passage may be configured to extend at an acute angle to a vertical plane extending between the bow and the stern of the vessel.

The passage may be configured to extend substantially parallel to a vertical plane extending between the bow and the stern of the vessel.

In any of these aspects, the passage and/or the platform may be inflatable.

In any of these aspects, the passage may be inclined to the platform and/or the structure in use. The passage may be a passage.

In any of these aspects, the escape system may further include the at least one craft, which may be a liferaft and/or which is preferably inflatable.

Other aspects of the present invention include:
The use of a platform control arrangement to provide a restoring force to the platform to assist in maintaining its position
The use of a platform control arrangement in conjunction with a lowering plate to assist in maintaining the position of the platform and system
The use of a platform control arrangement in conjunction with the end of the passage maintaining the position of the platform and system
Any combination of the above three elements to assist in positioning the platform or system

BRIEF DESCRIPTION OF THE DRAWINGS

For a better understanding of the present invention embodiments will now be described by way of example, with reference to the accompanying drawings, in which.

In the drawings, like elements are generally designated with the same reference sign.

DETAILED DESCRIPTION OF EMBODIMENTS OF THE INVENTION

Figure 1:
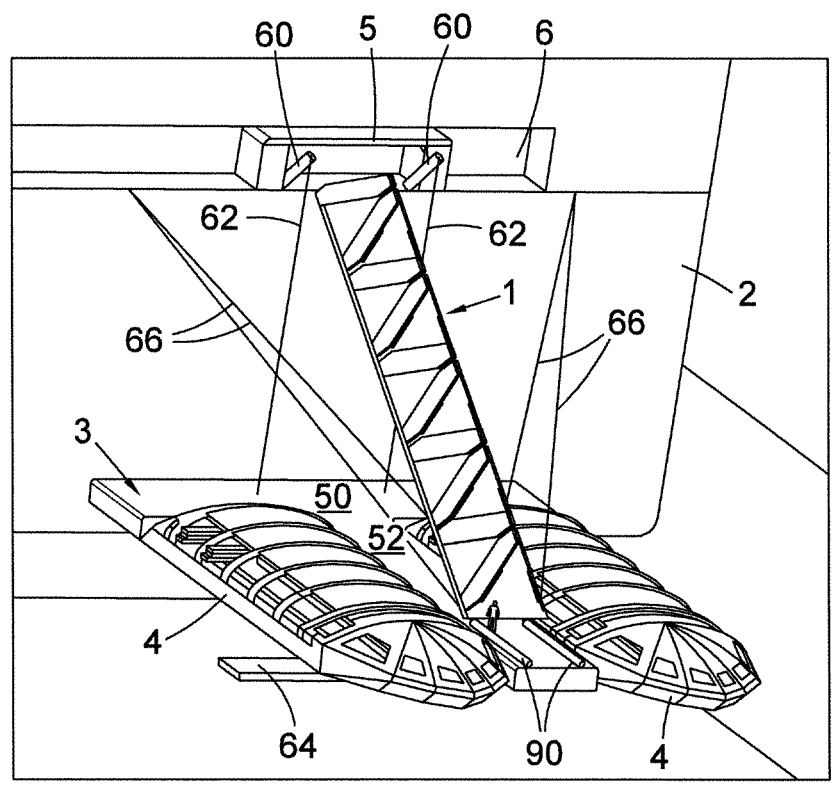
FIG. 1 shows a perspective view of an escape system in accordance with a first embodiment of the invention, that is deployed from a stowage unit on a ship.

FIG. 1 shows an inclined inflatable evacuation passage 1, in deployed and inflated configuration between a ship 2 and platform 3 from which inflatable survival crafts 4 are launched. Although the inflatable evacuation passage 1 is deployed from a ship 2 in the embodiment, it should be understood that that the passage 1 can extend from between from any structure, such as an oil rig. The passage 1 may be a slide.

The upper or entry end of the passage 1 is connected to a stowage unit 5, mounted on the ship 2. The stowage unit 5 may be fitted in a recess 6 is the ship's structure or on an open deck.

The lower or exit end of the passage 1 is connected to the platform 3 in a manner to be described below.

The passage 1 may be of the type disclosed in our co-pending patent application number GB1618108.3 filed on 26 Oct. 2016 and publication WO2018/078041 (our ref: 07088) which is hereby incorporated by reference.

Figure 2:
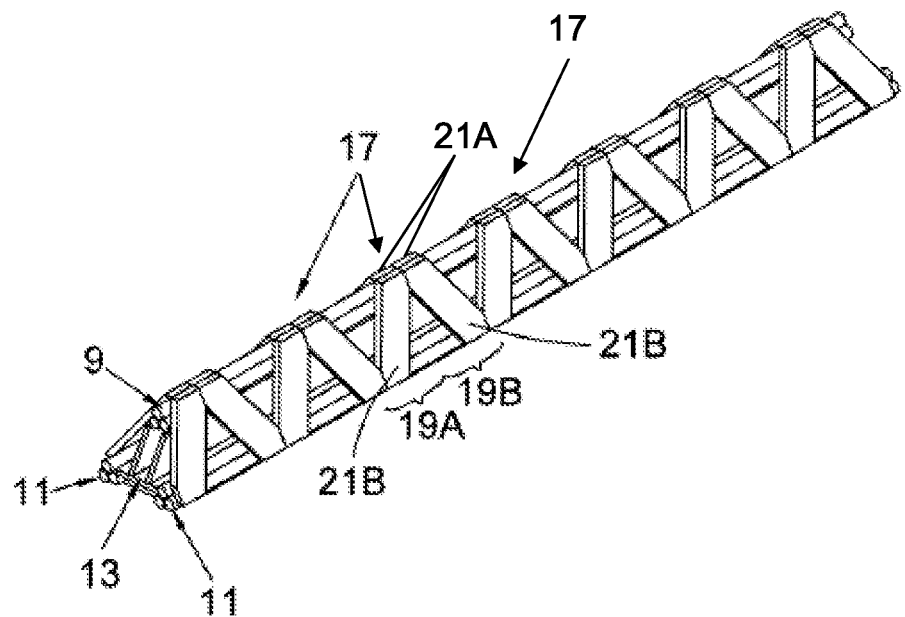
FIG. 2 shows a perspective view of a passage in accordance with embodiments of the invention.

Briefly, as shown on a larger scale in FIG. 2, the structure of the passage 1 comprises a framework comprising three longitudinal triple beams, one of which is an upper beam 9, in a substantially central position above the other two, which are lateral lower beams 11, between which is fixed and stretched over the whole length of the passage 1, a flexible track or trackways 13 (preferably four parallel chutes for rapid evacuation).

Each of the three longitudinal triple beams 9 and 11 comprises three longitudinal tubes, each in the form of an elongated cylinder having a substantially circular cross-section, individually inflatable (i.e. each inflatable independently of the others), stacked one above the other two so that they are tangential two by two over their length, and thus connected together adjacent and side by side. The tubes may be connected intermittently or continuously over their length, for example by an adhesive or by high-frequency welding, so that the cross-section of each beam 9 or 11 has substantially the shape of an equilateral triangle in the inflated state.

The framework of the passage 1 also comprises a plurality of stiffening modules 17, which are inflatable, but pneumatically and mechanically independent of each other, and arranged side by side at their base, from the entry end to the exit end of the passage 1, and each mechanically connected to the longitudinal tubes of the longitudinal beams 9 and 11 by connection means, and inflated from the longitudinal tubes of the longitudinal beams 9 and 11 by inflation means, so that, in the inflated state of the passage 1, they can brace and stay the beams 9 and 11, keeping them spaced apart transversally to their length, and so that they extend substantially parallel to each other, in order to give the inflated passage 1 a cross-section (perpendicular to the beams 9 and 11) having substantially the shape of an isosceles or equilateral triangle.

Each stiffening module 17 includes two symmetrical halves 19A and 19B, each being composed of two inflatable side panels 21A, B connected together at the top, before assembly of the two halves.

The side panels 21A and 21B of each half 19A and 19B of the stiffening module 17 are joined to each other.

Figure 3:
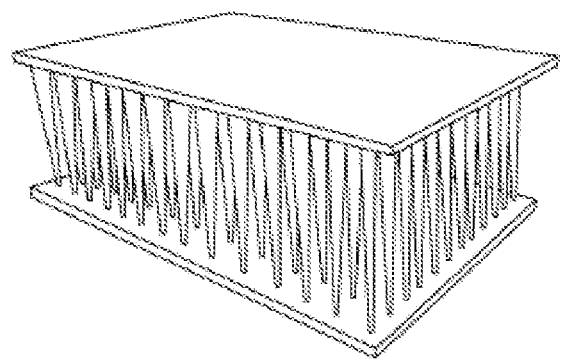
FIG. 3 shows a perspective view of a drop stitch material.

The side panels 21A/B are formed from drop stitch (or drop thread) material, which has the general form shown in FIG. 3. In such a material, thousands of (e.g. nylon) threads connect the two opposite faces to keep side panels 21A and 21B in the desired shape when inflated and to provide rigidity.

Each stiffening module 17 has, in the inflated state, the general outer shape of a hollow truncated pyramid with a square or rectangular base, the inclined edges of which are formed by two pairs of side panels 21A, 21B thus comprising four independent inflatable structures.

The base of the passage 1 comprises a plurality of abutting but independent floor panels. The floor advantageously provides a smooth flat surface. The floor panels are formed from drop stitch (or drop thread) material, which has the general form shown in FIG. 3. In such a material, thousands of (e.g. nylon) threads connect the two opposite faces to keep the floor panel in the desired shape when inflated and to provide rigidity. The air gap between the opposite faces also provides thermal insulation.

The crafts 4 may be of the type disclosed in our co-pending patent application number PCT/EP2017/053693 filed on 17 Feb. 2017 (our ref: 07076) and published as WO2017/140890 which is hereby incorporated by reference. PCT/EP2017/053693 claims priority from GB 1602866.4 of 18 Feb. 2016, which is also hereby incorporated by reference.

Figure 4:
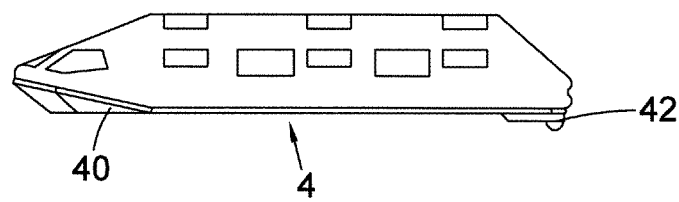
FIG. 4 shows a side view of an inflated craft with a pod attached thereto.

Briefly, as shown in FIG. 4 each craft 4 comprises a hull 40 formed from inflatable members, a canopy support structure carried by the hull and formed from inflatable members, an inflatable wall structure, and a rigid pod 42 configured to carry a survival craft in a deflated state and be coupled to the hull 40 when the craft is in an inflated state. The inflatable parts may be formed from drop thread material of the type shown in FIG. 3.

The crafts 4 may or may not have propulsion, such as an electric motor or internal combustion engine.

The platform 3 is a generally T-shaped inflatable structure with a generally flat upper surface that engages the passage 1. The platform 3 comprises a bar 50 that extends generally parallel to the side of the ship 2 in use, with a leg 52 extending perpendicularly from midway along the bar 50 in a direction away from the side of the ship 2 in use. The passage 1 engages the leg 52. A first one of the crafts 4 is accommodated in a first recess of the platform that is formed between the bar 50 and one side of the leg 52. A second one of the crafts 4 is accommodated in a second recess of the platform that is formed between the bar 50 and the opposite side of the leg 52.

The platform 3 may be formed from drop thread material of the type shown in FIG. 3.

The passage 1, the platform 3 and the crafts 4 are part of an evacuation system. As described above, each of the passage 1, the platform 3 and the crafts 4 comprise inflatable structures. These structures, when not deployed, are folded and stored in an uninflated state in the stowage unit 5.

The stowage unit 5 is weatherproof enclosure protecting the evacuation system from the external environment and providing a stable internal environment to safely store the marine escape system. The stowage unit may have a closable door to help provide the stable internal environment.

The storage unit 5 includes a launching appliance, which comprises a mechanism for moving the marine escape system form the stored position to the position where it is lowered in a controlled manner to the water, as shown for example in FIG. 1. The mechanism may comprise two davits 60.

Figure 5:
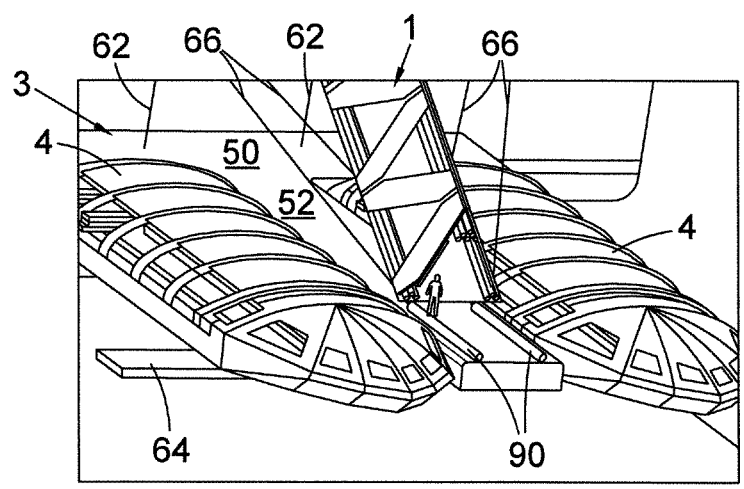
FIG. 5 is a partial enlarged view of FIG. 1.
Figure 6:
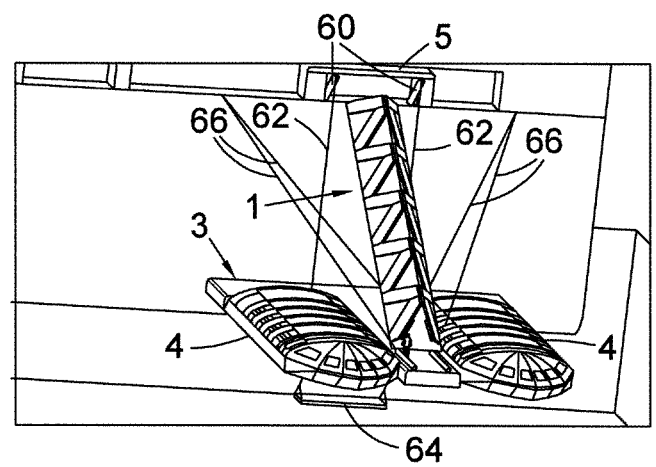
FIG. 6 shows the arrangement of FIG. 1 but with a lowering plate in a lowered position in the water.

A lowering plate 64 supports the two crafts 4, platform 3 and passage 1 when stored and when being lowered to the water. As shown most clearly in FIG. 5, the lowering plate 64 extends generally parallel to the bar 50 of the platform but spaced away therefrom towards the distal end of the leg 52 of the platform 3. After the crafts float off the lowering plate 64, the plate 64 is lowered to a safe distance below the surface of the water (as shown in FIG. 6) where it now acts as a stabilising plate to control the position of the platform 3 and passage 1.

Lowering lines 62 are stored on a winch that is attached to the stowage unit 5. The lowering lines 62 extend from the davits 60 through the platform 3, where they are attached to the lowering plate 64, to control the descent of the evacuation system to the water.

Stabilising bowsing control lines 66 extend between the side of the ship 2 and the passage 1 to tend to maintain the position of the passage 1 with respect to the ship 2.

Figure 7:
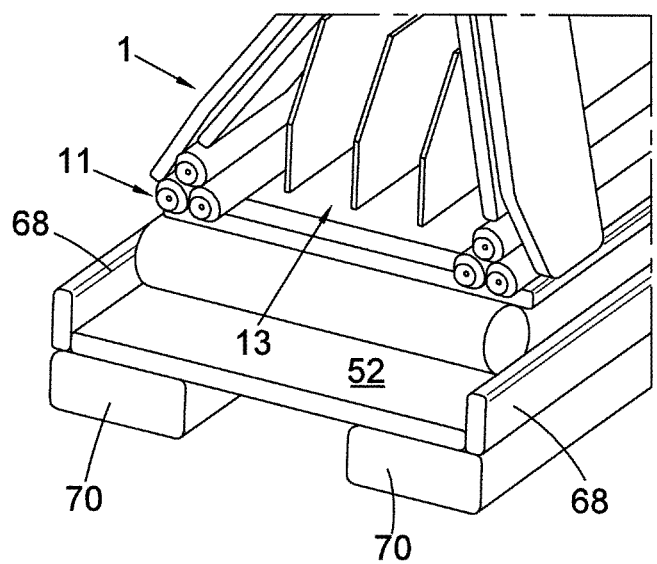
FIG. 7 shows a perspective view of the exit end of a passage and a platform including a passage guide wall/engagement member in accordance with embodiments of the invention.

As shown in FIG. 7, the edge of the leg 52 of the platform 3 may be arranged so that the side 1 cannot fall off due to wave (or other) movement. For example, vertical walls 68 may extend above the flat upper surface of the platform 3 along all or part of the leg 52.

Additionally, or alternatively, longitudinal stiffening beams 70 may be provided along the underside of the leg 52. The walls 68 and the stiffening beams 70 are inflatable and may be formed from drop thread material of the general arrangement shown in FIG. 3. Alternative inflatable structures may be used to form the side wall arrangements.

Figure 8:
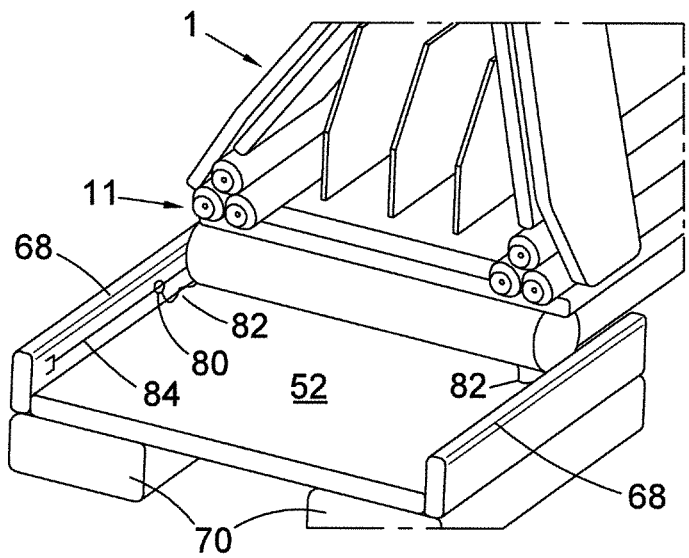
FIG. 8 shows a perspective view of the exit end of a passage and a platform including a retaining arrangement in accordance with embodiments of the invention.

As shown in FIG. 8, there may be also a retaining arrangement to secure the exit end of the passage 1 against wind (or other) force lifting it off the platform 3. The retaining arrangement may comprise a pair of hoops 80 (only one of which can be seen in FIG. 8) that are attached at or near the exit end of the passage 1 by respective passage cables 82. A platform rail or cable 84 (only one of which can be seen in FIG. 8) is attached to the interior side of each of the walls and extends generally parallel to the leg 52 of the platform 3. The platform rails or cables 84 pass through respective ones of the hoops 80. Such an arrangement allows the passage 1 to move forward and backward along the surface of the leg 52 of the platform 3 in a direction generally parallel to the platform rail or cable 84. However, relative movement between the passage 1 and the leg 52 of the platform 3 in other directions (e.g. due to wind), such as generally perpendicular to the surface of the leg 52 of the platform 3, is restricted by the connection between the passage hoops 80 and cables 82 and the platform rails or cables 84.

It is desirable for the platform 3 to be held against the side of the ship 3. Without any other forces applied, the platform will rest against the side of the ship 3. However, as the ship 2 and platform 3 move on the waves, the exit end of the passage 1 will move backwards and forwards across the top surface of the platform 3.

A platform control arrangement is provided, which is a device/arrangement or mechanism which provides a restoring force to the outboard of the platform 3 to tend to hold it against the side shell of the ship 2 (or other host vessel).

In order to 'pull' the platform 3 back against the side of the ship 2, a position restoring force is applied by the platform control arrangement that can be positioned between the end of the leg 52 of platform 3 and the exit end of the passage 1.

Figure 9:
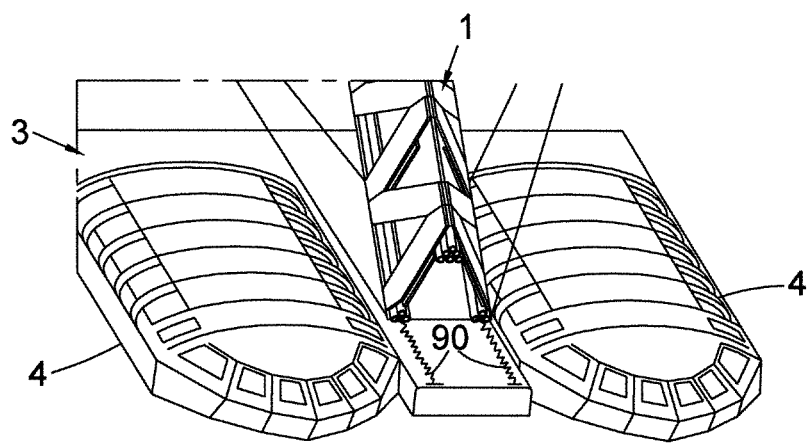
FIGS. 9, 10 and 11 correspond to FIG. 5 and show various platform control arrangements.

This force can be generated by several methods. The force can be generated by fitting spring type devices 90, as shown in FIG. 9, between the exit end of the passage 3 and the distal end of the leg 52 of platform 3. The spring type devices may be elastically deformable objects used to store mechanical energy, such as either mechanical metal springs (e.g. coil tension springs) or elastic shock cord types.

With a platform control arrangement installed between the exit end of the passage 3 and the distal end of the leg 52 of platform 3, as the ship 2 rolls away from the platform 3, moving the exit end of the passage 3 inboard along the surface of the leg 52 of platform 3, the spring type device 90 is extended, and the force it exerts increases, thereby applying a restoring force to pull the platform 3 back against the side of the ship 2.

Multiple spring devices 90 may be used to generate the restoring force. Two are shown in FIG. 9.

Figure 10:
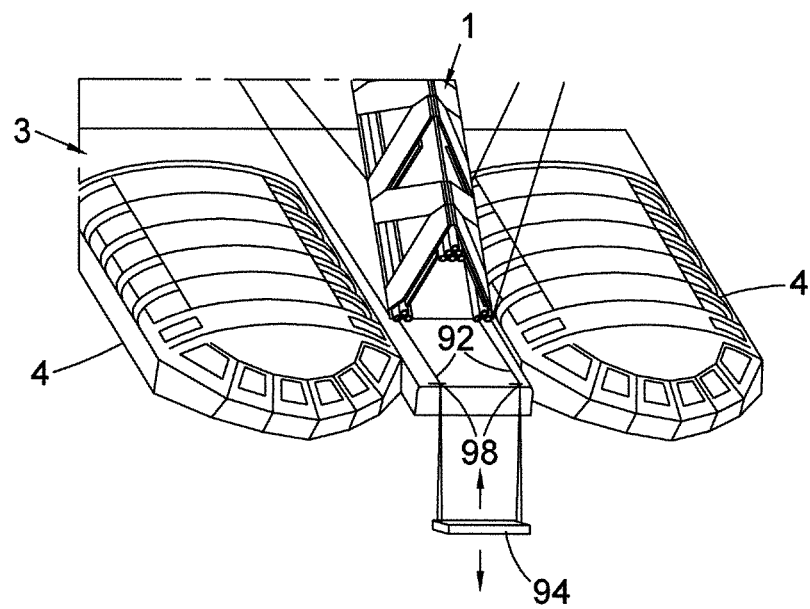
Figure 11:
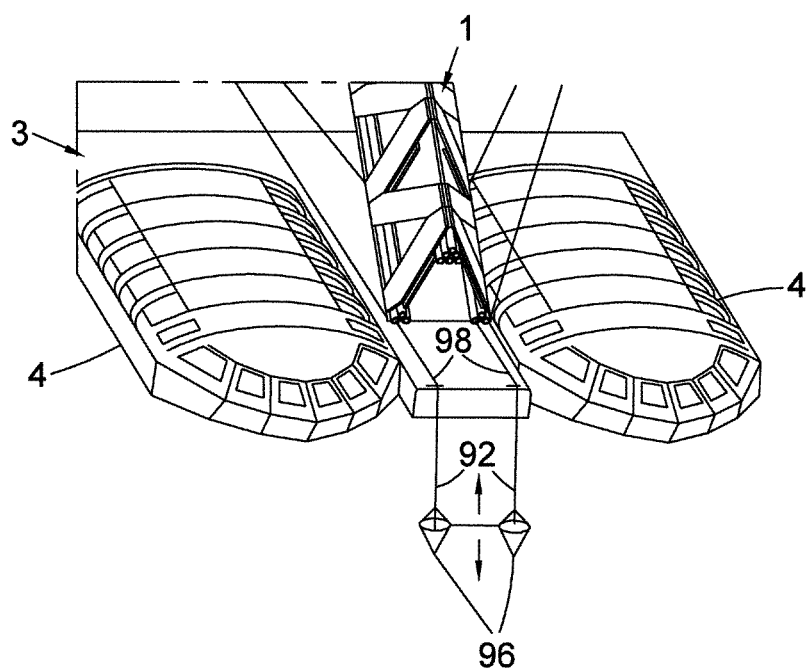

Other platform control arrangements for generating the restoring force may alternatively or additionally be provided. For example, such an arrangement may include running a line or lines 92 over the outboard edge of the platform from the exit end of the passage 3, with a weight 94 (as shown in FIG. 10) or sea anchor 96 (as shown in FIG. 11) attached to the lower end of the line or lines 92. Guide members 98 may be provided at the distal end of the passage 3 to control the path of the line or lines 92. As the ship 2 rolls away from the platform 3, the exit end of the passage 1 is pulled inboard across the top of the platform 3, lifting the weight 94 or sea anchor 96 up, creating drag. This drag is has a similar effect to the spring force, creating the restoring force. As the passage 3 moves outboard, the weight 94 then sinks and the sea anchor 96, which is weighted, collapses and sinks, expanding again when the passage 1 moves inboard. Multiple sea anchors 96 and weights 94 may be used.

FIGS. 12 to 16 show a second embodiment of the invention which includes a distal end portion 100 at the exit end of the passage 1. The distal end portion 100 is arranged to contact the leg 52 of the platform 3, and may extend generally parallel to the upper surface of the leg 52 (in contrast to the main body of the passage 1 which is inclined with respect to the surface of the platform 3).

The arrangement of the passage 1 and the platform 3 of the second embodiment may be generally the same as that of the first embodiment. Similar elements are designated with the same reference signs and will be not be described again, for the sake of brevity.

Figure 14A:
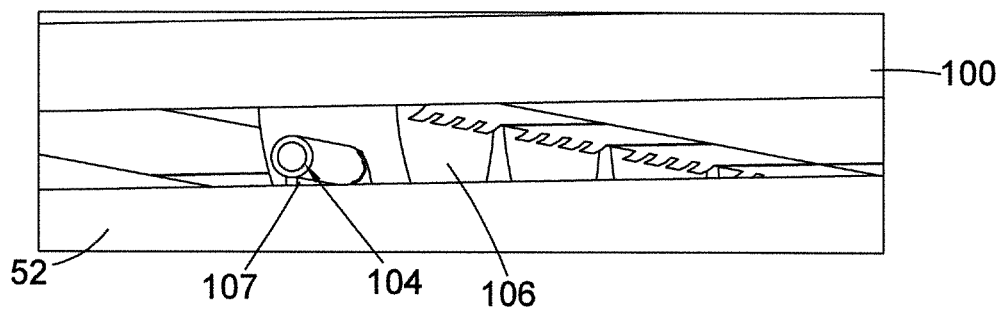
FIGS. 14A and 14B show perspective views of a first rail and recess arrangement for mounting the passage on the platform.
Figure 14B:
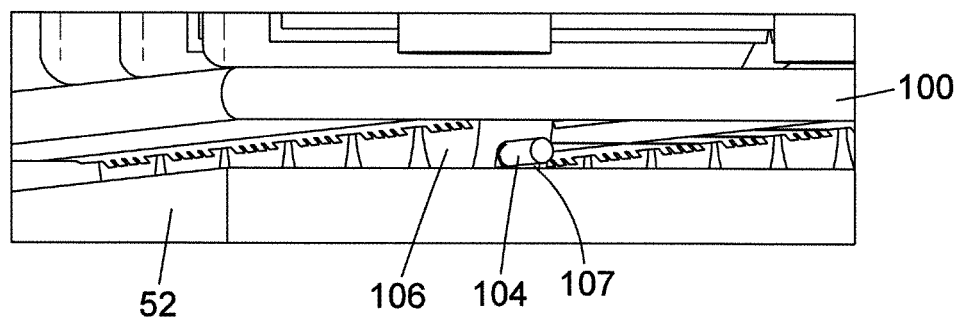

In one aspect, a plurality of rails 104 extend generally parallel to one another in a longitudinal direction along the length of the leg 52 of the platform 3, as best shown in FIGS. 14, 15 and 16. The underside of the distal end portion 100 (the side facing the upper side of the leg 52 of the platform 3) includes a plurality of corresponding generally parallel recess members 106. The recess members 106 are configured to receive the rails 104. In FIGS. 14A and 14B, the recess members 106 have a generally rectangular recess 107 formed therein, while the rails 104 are generally circular in cross section. The arrangement shown in FIGS. 14A and 14B allows relative sliding movement in the longitudinal direction between the platform and the exit end of the slide 1 whilst restricting relative transverse movement between the exit end of the slide 1 and the platform 3.

Figure 15A:
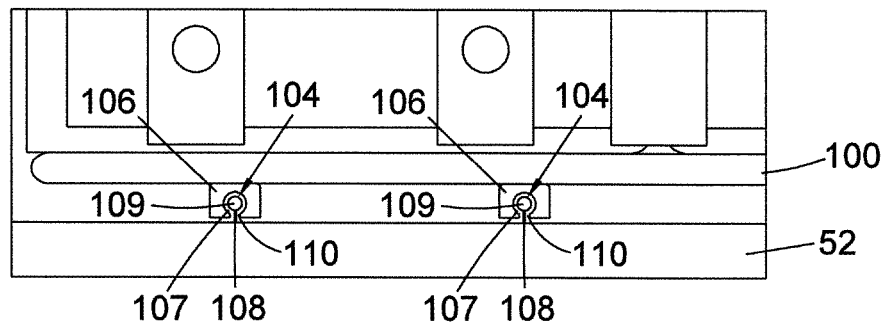
FIGS. 15A, 15B and 15C show perspective views of a second rail and recess arrangement for mounting the passage on the platform.
Figure 15B:
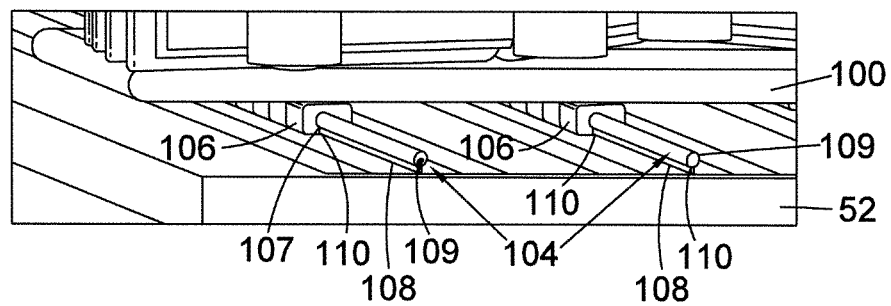
Figure 15C:
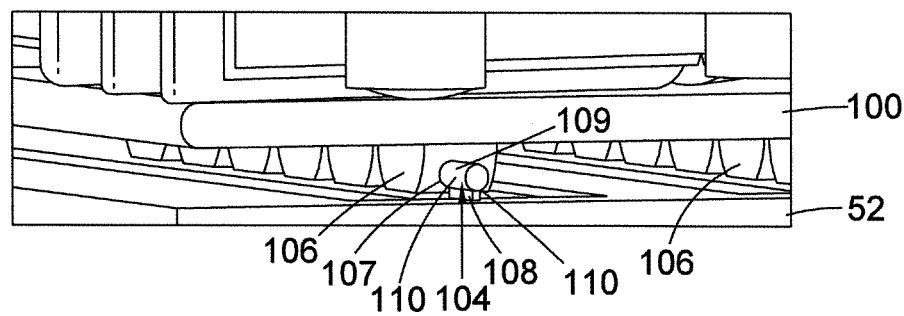

In an alternative arrangement, as shown in FIGS. 15A, 15B and 15C, the rails 104 include a coupling portion 109 that is connected to the leg 52 of the platform 3 by a relatively narrow (in a transverse direction) connector 108. The recess member 106 has a recess 107 that includes a chamber having a relatively narrow mouth 110 (in the transverse direction). When the coupling portion 109 is a accommodated in the chamber the connector 108 passes through the mouth 110. Longitudinal relative sliding between the distal end portion 100 and the platform 3 is possible. However, separation of the distal end portion 100 from the platform 3 in the vertical direction is not possible because the coupling portion 109 has a greater width than the mouth 110.

The coupling portion 109 and the chamber may have a substantially circular cross-section, although other cross-sectional shapes are possible within the scope of the invention.

Figure 12:
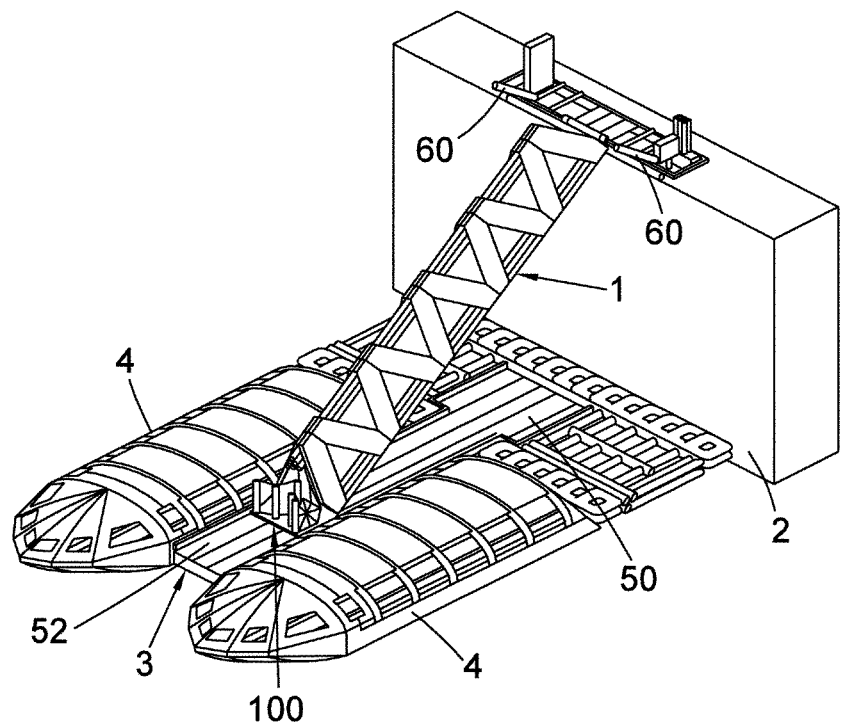
FIGS. 12 and 13 show perspective views of an escape system in accordance with a second embodiment of the invention, that is deployed from a stowage unit on a ship and which includes a distal end portion of the passage.
Figure 12A:
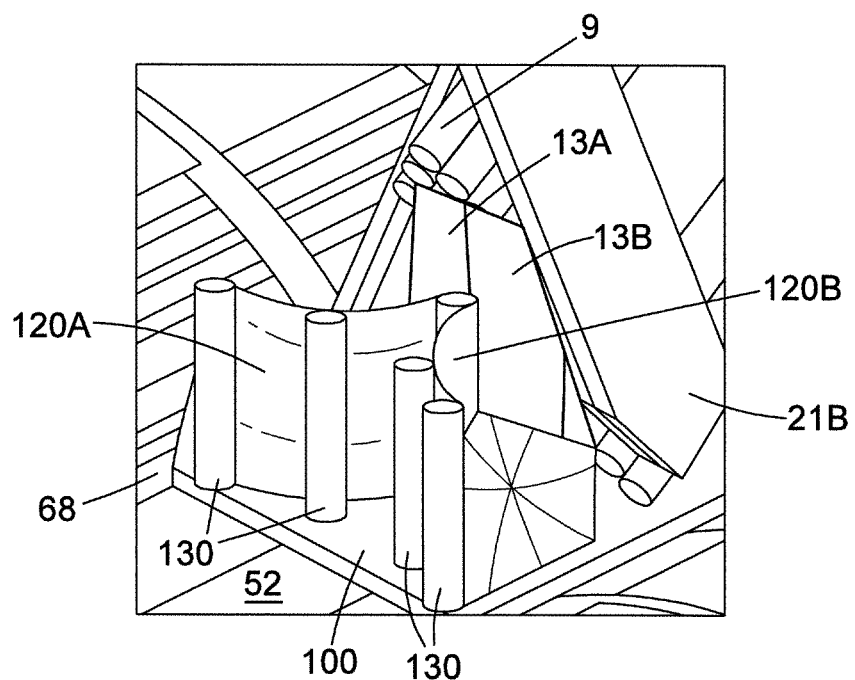
FIG. 12A is a partial enlarged view of FIG. 12.
Figure 13:
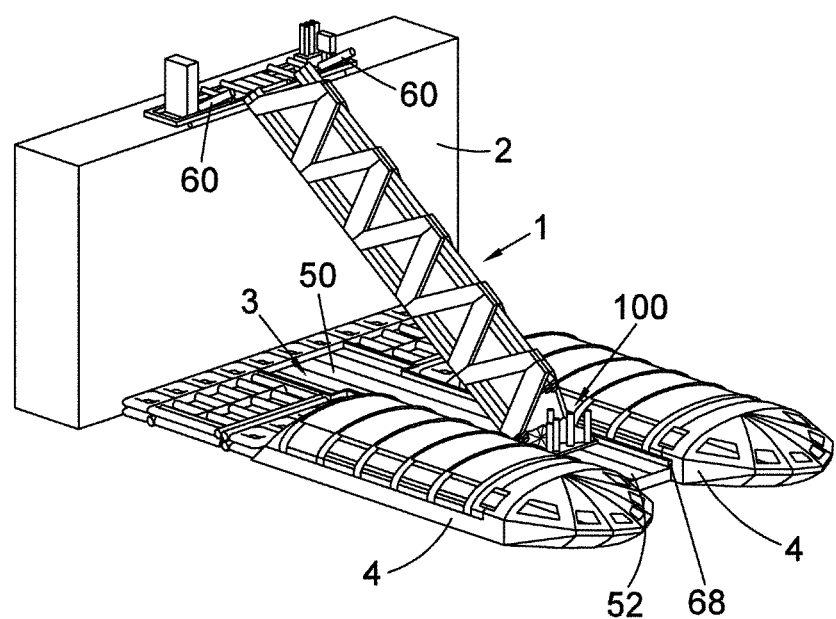
Figure 16A:
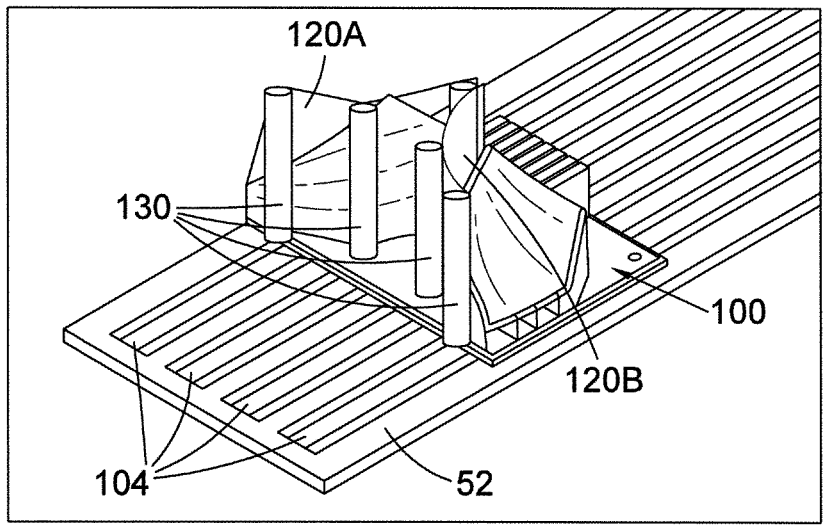
FIGS. 16A and 16B show perspective views of the distal end portion of the passage incorporating a guide wall for evacuees, with the passage itself omitted for the sake of clarity.
Figure 16B:
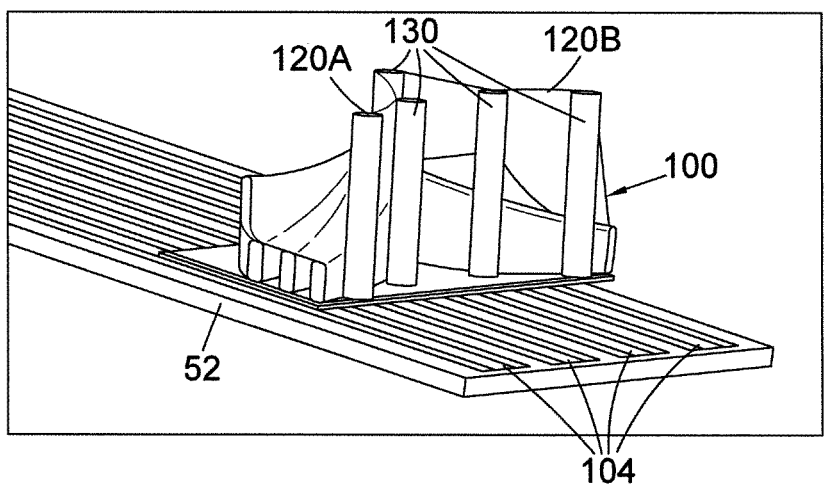

As shown in FIGS. 16A and 16B, the distal end portion 100 may be configured to direct evacuees from the passage 1 in a particular direction after they exit the passage 1 so that they are in an appropriate position on the platform 3 to board the liferaft 4. As described in relation to FIG. 2 flexible chutes or trackways 13 may be provided within the structure of the passage 1, along which evacuees slide. In the second embodiment two chutes 13 are provided—13A and 13B as best shown in the enlarged view in FIG. 12A.

The distal end portion 100 includes a first guiding wall 120A associated with the first chute 13A and a second guiding wall 120B associated with the second chute 13B. The guiding walls 120A and 120B are curved. The part of the walls 120A and 120B that are connected to the common dividing wall of the chutes 13A and 13B is generally parallel to that wall. The opposite end of the guiding wall is almost perpendicular to the dividing wall. The guiding walls 120A and 120B therefore gently guide the path of an evacuee from a longitudinal direction along the chutes 13A and 13B into a transverse direction, so that the evacuees are safely guided to a particular area of the leg 52 of the platform 3 for boarding the crafts 4. The walls 120A and 120B may also slow the descent of the evacuees so that they arrive at the platform at a safe speed.

The walls 120A and 120B may be supported on the distal end portion 100 by a series of supporting pillars 130.

The distal end portion 100 may include an inclined and curved floor that bridges the difference in height between the exit of the chutes 13A and 13B and upper surface of the leg 52 of the platform 3.

According to a third embodiment, the passage 1 may have a different orientation. The structure of the passage 1 of the third embodiment may be generally the same as that of the first or second embodiment. Similar elements are designated with the same reference signs and will be not be described again, for the sake of brevity.

Figure 17:
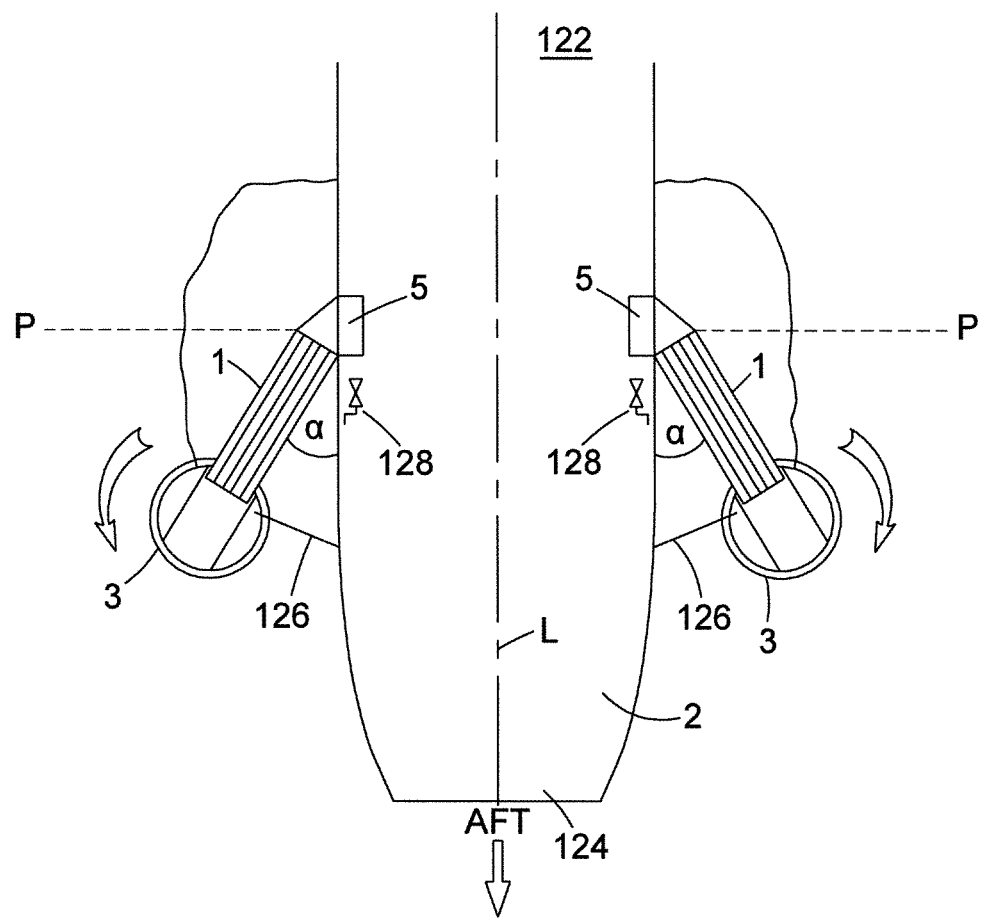
FIG. 17 shows an overhead view of a ship having passages arranged according to a third embodiment of the invention.

In FIGS. 1 to 16 the passage 1 extends in a vertical plane that is generally perpendicular to the side of the ship 2—in the direction P shown in FIG. 17. In the third embodiment, the passage 1 is configured to extend aft from the evacuation point (corresponding to the position of the stowage unit 5).

The passages 1 extend at an acute angle α to a vertical plane L extending between the bow 122 and the stern 124 of the ship 2. The angle α to the vertical plane L may be less than 45. The passages 1 may be generally parallel to the plane L.

A first control line 126 extends from the port side of the ship 2 and is attached to either the platform 3 or the passage 1 on the port side of the ship 2. A second control line 126 extends from the starboard side of the ship 2 to either the platform 3 or the passage 1 on the starboard side of the ship 2. The length of the control lines 126 may be adjusted by an associated control line winch 128. The shorter the control lines 126, the smaller the angle α between the passage 1 and the plane L.

Although the system has been described with two crafts, it should be appreciated that one or any number of crafts may be used with the system.

The various features and embodiments described above can be used individually or in any combination. These features include:

The lowering plate 64

The walls 68 extending above the flat upper surface of the platform 3

The retaining arrangement, such as shown in FIG. 8

The platform control arrangement, such as shown in FIG. 9, 10 or 11

The distal end portion (the distal end portion may be integral with the passage 1; the first embodiments may be provided with a distal end portion like that of the second and third embodiments)

The guide walls

The rails and recess members

The aft orientation of the passages

The invention claimed is:

1. An escape system comprising:
a passage having an entry end and an exit end, and
a platform for allowing access to at least one craft, the platform being deployable from a structure to water to facilitate evacuation of the structure via the passage,
wherein the passage is mounted to the platform by connecting means such that the platform is urged towards the structure when deployed,
wherein the connecting means comprises an elastically deformable member that is deformed elastically in response to relative movement of the platform away from the structure, and
wherein the elastically deformable member is fitted between the exit end of the passage and an outboard edge of the platform.

2. The escape system of claim 1, wherein the elastically deformable member comprises a tension spring or an elastic cord.

3. The escape system of claim 1, wherein at least one of the passage and the platform are inflatable.

4. The escape system of claim 1, wherein the passage is inclined to at least one of the platform and the structure in use.

5. The escape system of claim 1, further including the at least one craft, such as a liferaft, and which is preferably inflatable.

6. An escape system comprising:
a passage, and
a platform for allowing access to at least one craft, the platform being deployable from a structure to water to facilitate evacuation of the structure via the passage,
wherein the passage is mounted to the platform such that movement of the passage relative to the platform is restricted in at least one direction,
wherein one of the platform and the passage includes at least one engagement member for slidably engaging a corresponding structure of the other of the platform and the passage such that the movement of the passage relative to the platform is restricted in the at least one direction, and
wherein the engagement member comprises a rail and the corresponding structure for slidably engaging the rail comprises a recess member defining a recess for accommodating the rail.

7. The escape system of claim 6, wherein the recess is substantially at least one of rectangular and semi-circular in cross-section, and is configured for fitting onto the rail.

8. The escape system of claim 6, wherein the rail incudes a coupling portion that is connected to the associated one of the platform and the passage by a relatively narrow connector, and wherein the recess incudes a chamber having a relatively narrow mouth, the chamber being configured to accommodate the coupling portion of the rail, with the connector extending through the mouth.

9. The escape system of claim 8, wherein the coupling portion and/or the chamber are substantially circular in cross-section.

10. The escape system of claim 6, wherein the platform is coupled to the passage so as to restrict lifting of the passage from an upper surface of the platform.

* * * * *